May 11, 1943. W. BUXTON 2,318,750
FASTENING MEANS FOR FLEXIBLE MEMBERS
Filed March 20, 1940

INVENTOR
WARNER R. BUXTON
BY Chapin & Neal
ATTORNEYS

Patented May 11, 1943

2,318,750

UNITED STATES PATENT OFFICE 2,318,750

FASTENING MEANS FOR FLEXIBLE MEMBERS

Warner R. Buxton, Longmeadow, Mass.; Mabel Allen Buxton, executrix of said Warner R. Buxton, deceased, assignor to Buxton, Incorporated, a corporation of Massachusetts Application March 20, 1940, Serial No. 325,035

3 Claims. (Cl. 150—42)

This invention relates to improvements in fasteners of the tongue and slot type, such as are adapted for holding together, in an easily releasable manner, overlapping members of flexible material such, for example, as the walls of a flexible pocket receptacle.

The invention finds one advantageous use as a fastener for the closure flaps of flexible pocket receptacles, such as wallets, billfolds, and the like.

This application is a continuation in part of my application Serial No. 274,328, filed May 18, 1939, for an invention in flexible pocket receptacles.

The invention has for an object the provision in a tongue and slot fastener for overlapping members, of a deflector which is mounted in and extends through the slot, projecting inwardly from the slot along the inner face of the slotted member and projecting outwardly from the slot along the outer face of the slotted member in position to engage and deflect the tongue.

The invention also has for an object to provide in a tongue and slot fastener of the type described, an improved mounting for the deflector characterized in that the deflector has notches one in each of two opposite ends thereof and in that these notched ends are seated one in each of the ends of the slot.

The invention has for a further object to provide in a fastener of the type described, a deflector which is pivotally supported from the ends of the slot and a means acting on the inwardly-extending part of the deflector for holding the deflector in tongue-engaging position.

These and other objects will best be understood as the detailed description proceeds and they will be pointed out in the appended claims.

The invention will be disclosed with reference to the accompanying drawing, in which.

Figure 1:
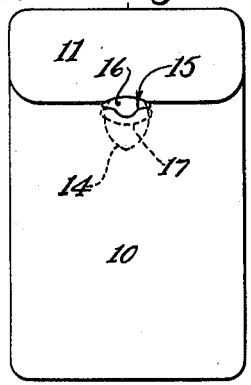
Figs. 1 and 2 are front and side elevational views, respectively, of a flexible pocket receptacle embodying in its closure the fastening means of this invention.
Figure 2:
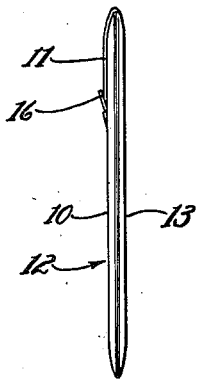

Referring to the drawing, the fastener, as herein illustrated, is used for holding together, in a manner to enable easy disengagement when required, the two overlapping members 10 and 11 of a flexible pocket receptacle 12 shown in Figs. 1 and 2. This receptacle, which may be made of leather or the like, comprises a front wall consisting of the member 10, a back wall 13 of substantially the same size and shape, and a closure flap foldably connected to the upper edge of wall 13 and consisting of the member 11. The walls 10 and 13 may be secured along their mating side edges and bottom edges, forming between them a pocket which opens at its upper end and is normally closed by the flap 11. The closure flap 11 is fastened to the front wall 10 by a tongue 14 which is engaged in a slot 15 formed in the wall 10.

The invention relates primarily to improvements in a fastener of the tongue and slot type. Accordingly, the form of the receptacle, shown in Figs. 1 and 2, is not important and may be varied as desired. As far as the invention is concerned, all that is necessary as a background for the present invention are two members of flexible material, such as 10 and 11, which overlap and which are held together by the engagement of a tongue on one member in a slot in the other member. These members 10 and 11 need not necessarily be walls of the same receptacle nor need they necessarily define a receptacle.

The present invention features an element which is mounted in the slot 15 and extends entirely through the same having, as shown, an outer portion 16 which extends outwardly from the slot along the outer face of the slotted member 10 and an inner portion 17 which extends inwardly from the slot along the inner face of said member. The outer portion 16 functions as a deflector, being positioned so as to engage the tongue 14 as it is slid along wall 10 toward the slot 15 and direct it into such slot.

Figure 7:
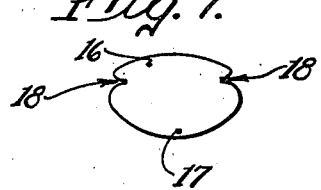
Fig. 7 is a front elevational view of the deflector before being mounted in said slotted wall.

The deflector is preferably engaged at its ends one in each end of the slot. For example, the deflector may be provided with notches 18, one at each of two opposite ends thereof, as shown in Fig. 7. The deflector is mounted by first seating one notched end in one end of slot 15, then bending the deflector between its ends enough to allow the other notched end to be pushed into the slot and then moved endwise in the slot until its second-named notched end is seated in the other end of the slot. The deflector and the slotted member are each of material flexible enough to allow bending of one or the other to a sufficient extent to enable the described assembly. When seated in the slot, the deflector is firmly held in place. Each notched end straddles the adjacent end wall of the slot and holds the deflector from being pulled outwardly or pushed inwardly in the slot. Also, the distance between the bottoms of the two notches 18 is substantially equal to the straight-line distance between the ends of the slot, whereby the deflector is held against movement to any substantial degree in a direction lengthwise of the slot.

Figure 3:
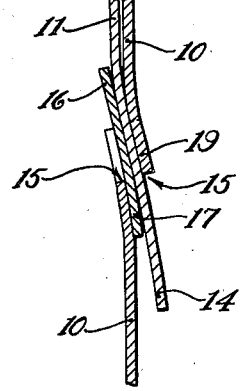
Fig. 3 is a fragmentary sectional view taken on the line 3—3 of Fig. 1 and drawn to a much larger scale.
Figure 4:
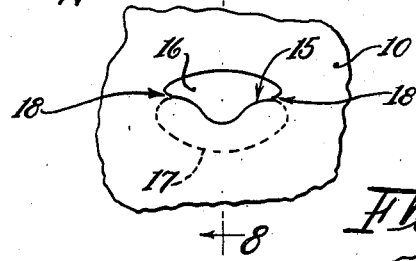
Figs. 4 and 5 are fragmentary front and rear elevational views, respectively, showing the deflector mounted in place in the slotted wall of the receptacle.
Figure 5:
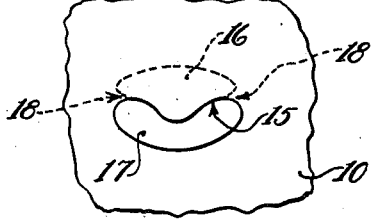
Figure 6:
Fig. 6 is a fragmentary front elevational view of said slotted wall before the deflector has been mounted therein.
Figure 8:
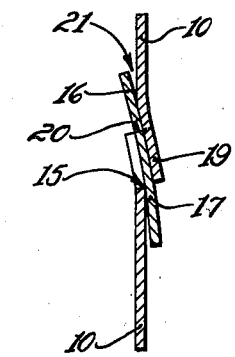
Fig. 8 is a fragmentary sectional view taken on the line 8—8 of Fig. 4.

It is considered desirable and important to have the deflector pivotally supported in its slot. One effective way of accomplishing this result in a very satisfactory manner is by the described form of mounting. The notched ends of the deflector straddling the end walls of slot 15 act somewhat like trunnions and support the deflector for pivotal movement about an axis extending through the ends of the slot. With such an arrangement, the deflector, at least when originally assembled in the slot, would tend to assume a position more or less at right angles to the member 10, depending on the amount of clearance between the sides of the notches 18 and wall 10. In order to hold the deflector at a materially less angle with respect to member 10 and also to move the deflector back to its normal position whenever deflected therefrom, means are provided on member 10 which act on the inner portion 17 of the deflector to accomplish the purpose. Thus the slot 15 between its ends may be bowed or bent away from the pivotal axis in the direction of insertion of the tongue. This leaves a portion 19 which lies below the pivotal axis, designated at 20 in Fig. 8, and which presses on the inner portion 17 of the deflector tending to move it toward the inner face of member 10 and to swing the outer portion 16 toward the outer face of member 10. The deflector will not be forced flatly against said faces and its inward limit is substantially as shown in Fig. 8, wherein the portion 16 lies at an acute angle to member 10 forming therewith a mouth 21 converging toward the entrance of the slot. Thus the tongue, when moved downwardly along wall 10, will engage the portion 16, enter mouth 21 and be guided into the slot. Fig. 3 shows the tongue positioned in the slot in fastening position.

The particular form of slot 15 is not important and it need not necessarily be made of curved lines as shown. Any shape of slot can be used so long as it provides a part like 19 which, irrespective of its shape, is located beyond the axis of the deflector (defined by a straight line extending through both notches 18) and on the opposite side of the axis from the outer part 16 for the purpose of pressing, somewhat like a spring, on the inner portion 17.

The parts of the fastener are disposed somewhat in the fashion of shingles or clapboards when the parts are viewed inverted from the positions illustrated. Take Fig. 3 for example, the deflector portion 16 overlies the member 11 or tongue 14, and the member 10 overlies the deflector portion 16—the latter projecting beyond the member 10 and the tongue 14 or member 11 extending beyond the deflector portion 16.

Figure 9:
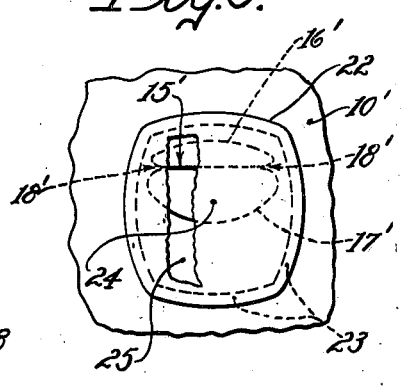
Fig. 9 is a fragmentary rear elevational view showing a modification.

In Fig. 9, another means is shown for accomplishing the function of controlling or limiting the pivotal movement of the deflector. In this view, parts which correspond with those shown in Figs. 1 to 8 are designated by the same reference numerals with the addition of a prime. Here, the deflector has notched ends 18' which are seated in the ends of the slot 15, and outer and inner portions 16' and 17' respectively, as before, except that the slot is in the form of a straight line coinciding with the axis of pivotal movement of the deflector. A patch 22 of leather or other suitable material is secured to the inner face of member 10 in any suitable way, as by cementing it along its margins as indicated at 23. A portion 24 of this patch presses against the inner portion 17' and thereby acts to releasably hold the outer portion 16 in tongue-engaging position. The patch 24 is, of course, so constructed as to afford a recess or pocket 25 of adequate size to receive and house the tongue 14.

The invention affords an improved form of deflector for guiding the tongue into the slot of a tongue and slot type of fastener. It also affords an improved mounting for the deflector, characterized in that it is firmly held by notched ends straddling the end walls of the slot and enables, if desired, controlled pivotal movement of the deflector.

What I claim is:

1. A fastener for overlapping members of flexible material, one of said members having a slot and the other a tongue constructed for easy insertion into and withdrawal from said slot, and a deflector having notches one at each of two opposite ends of the same and mounted in said slot with its notched ends engaged one with each of the end walls of said slot, said deflector having a portion projecting beyond the slot along the inner face of the slotted member and a portion projecting beyond the slot along the outer face of the slotted member, the second-named portion positioned to engage the tongue as it is moved toward the slot and force the tongue into the slot.

2. In a flexible receptacle, having a pair of overlapping walls of flexible material with a tongue on one end and a slot on the other to receive the tongue and hold the walls together, said slot being bowed outwardly between its ends away from the tongue, and a deflector for forcing the tongue into said slot as it is pushed toward the same, said deflector comprising a flexible member passing through said slot and being pivotally supported at opposite ends from the ends of said slot.

3. A fastener for overlapping members of flexible material, one of said members having a slot and the other a tongue constructed for easy insertion into and withdrawal from said slot, a deflector pivotally supported at opposite ends from the ends of the slot and extending through the slot, said deflector having an outer portion positioned in the path of the tongue as the tongue is moved toward the slot to direct the tongue into the slot and having an inner portion projecting from the slot along the inner face of the slotted member, and means on the slotted member acting on said inner portion to hold the outer portion positioned in said path.

WARNER R. BUXTON.

CERTIFICATE OF CORRECTION.

Patent No. 2,318,750.                              May 11, 1943.

WARNER R. BUXTON.

It is hereby certified that error appears in the printed specification of the above numbered patent requiring correction as follows: Page 2, second column, line 8, for "slot 15" read --slot 15'--; line 49, claim 2, strike out the word "end"; and that the said Letters Patent should be read with this correction therein that the same may conform to the record of the case in the Patent Office.

Signed and sealed this 8th day of June, A. D. 1943.

Henry Van Arsdale, (Seal)                              Acting Commissioner of Patents.